United States Patent [19]
Suzuki

[11] 3,973,743
[45] Aug. 10, 1976

[54] AUTOMATIC SWITCH-OFF SYSTEM IN A CASSETTE TAPE RECORDER

[75] Inventor: Nobuo Suzuki, Sagamihara, Japan

[73] Assignee: Technical Incorporated, Japan

[22] Filed: Feb. 24, 1975

[21] Appl. No.: 552,266

[30] Foreign Application Priority Data
Mar. 5, 1974 Japan............................ 49-25501

[52] U.S. Cl................................ 242/186; 360/74
[51] Int. Cl.²................. B65H 59/38; G03B 1/04; G11B 15/32
[58] Field of Search............................ 242/186–191; 360/71, 74

[56] References Cited
UNITED STATES PATENTS

| | | |
|---|---|---|
| 3,582,013 | 6/1971 | Beretta............................ 242/186 |
| 3,677,493 | 7/1972 | Staar................................ 242/191 |

*Primary Examiner*—Leonard D. Christian
*Attorney, Agent, or Firm*—Hill, Gross, Simpson, Van Santen, Steadman, Chiara & Simpson

[57] ABSTRACT

An automatic switch-off system for use in a cassette tape recorder. A tape feed shaft is axially supported at one end of an arm lever which has its rotating center at an axis of a relay gear for transmitting the driving power to the tape feed shaft. The tape feed shaft and an encircling hub are moved against the cassette case at the end of tape feeding or rewinding operation by the drawing force of the tape. This movement of the shaft urges the arm lever to release the tape running state by causing a lever to rotate and engage a pin on a pulley which supplies the driving power. This pin causes the lever to move laterally thus permitting a tape running set lever to disengage.

6 Claims, 1 Drawing Figure

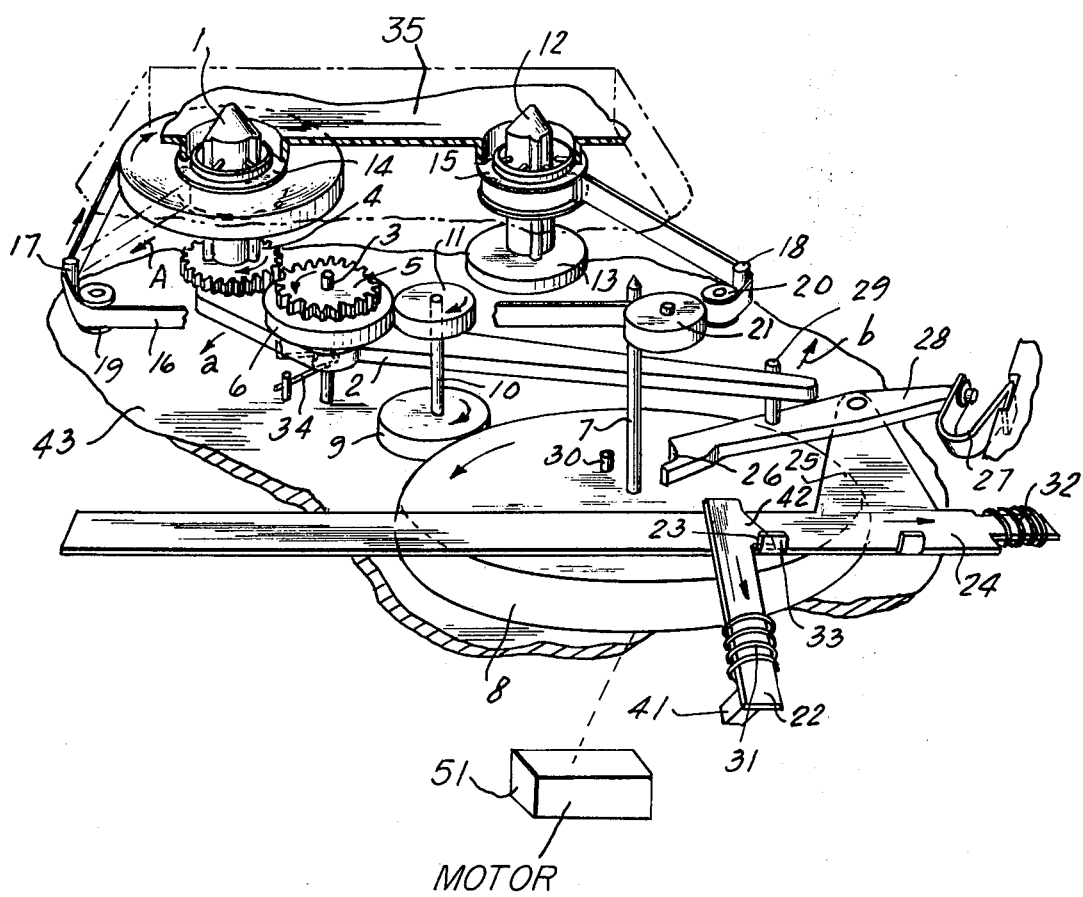

AUTOMATIC SWITCH-OFF SYSTEM IN A CASSETTE TAPE RECORDER

BACKGROUND OF THE INVENTION

1. Field of the Invention

The present invention relates generally to a cassette tape recorder and more particularly to an automatic switch-off system when a tape forward winding or rewinding is completed.

2. Description of the Prior Art

There have already been designed various types of automatic switch-off systems in tape recorders. These may be divided into such types as an electric means for switching-off the state of tape running with an electromagnet which is energized by electric signals generated by photoelectric or electric means of sensing completion of winding the tape; a mechanical means torque system wherein the overload in the tape rotating mechanism at the time of completion of tape winding is used as sensing signals; a mechanical differential system wherein the difference in the movements of capstan shaft and tape running coupling member is used as a sensing signal; and finally a combination of the mechanical sensing means and an electromagnet which switches off the system.

However in using electric means for a sensing member, it is necessary to specially design a part of the tape to be sensed and an electromagnet is necessary for converting the electric signals obtained by the sensing member into mechanical actions. The incorporation of the electromagnet makes the tape reproducer and recorder bulky and heavy.

Therefore, this sort of electric means and the above mentioned combined means are not suitable for a small, portable tape recorder. However, the above mentioned mechanical means is best suited for an automatic switch-off system in a small tape recorder due to simple construction, efficient high volume production, and compactness.

SUMMARY OF THE INVENTION

An object of this invention is to provide an improved automatic switch-off system in a cassette tape recorder or similar device.

A further object of this invention is to provide an automatic switch-off system which is mechanical, compact, and light in weight.

A further object of this invention is to provide an automatic switch-off system which is easy to construct and utilizes a minimum number of additional components.

The present invention relates to an improved automatic switch-off system in a cassette tape recorder or similar device. The difference in diameter of the tape feed hub in the cassette case and the hub receiving area in the cassette case allows a movement of the tape feed shaft inside the tape feed hub when the tape pulls on the hub. This movement urges an arm lever to release the tape running set lever to release by causing a lever to rotate and engage a pin on a pully which supplies the driving power. This pin causes the lever to move laterally, thus disengaging the running set lever.

BRIEF DESCRIPTION OF DRAWING

The drawing is a perspective view of a mechanism of the automatic switch-off system embodying the present invention.

DESCRIPTION OF THE PREFERRED EMBODIMENTS

A tape feed shaft 1 is pivotally mounted on one end of an oscillating arm lever 2. On said arm lever 2 there is also mounted a spring 34 adapted to rotate the arm lever in the clockwise direction when viewed from the top. On a shaft 3, which axially supports the arm lever 2, there are mounted a relay gear 5 which meshes with a gear 4 which is an integral part of the tape feed shaft 1, and a pressure roller 6, which is pivotally an integral part of said relay gear 5.

On the other hand, a driving wheel 9 and a shaft 10, which are the integral part of a roller 11, are provided to make pressure contacts to and separations from the circumference of a pulley 8 which is an integral part of a capstan shaft 7, which is driven by a capstan motor 51. The pressure roller 11 is adapted to make pressure contacts to and separations from the pressure roller 6 simultaneously, through the driving wheel 9 and the shaft 10, with the movements of the driving wheel 9 against the pulley 8. The tape feed shaft 1 is driven to rewind in the clockwise direction in the drawing by the driving power delivered through the above pressure contacts from pulley 8.

A winding shaft 12 is driven by a driving motor (not shown) and a known driving power transmission means, such as belt drive or idler drive. Fast forward action is attained by the pressure contact made by the pressure roller 11 to a roller 13, an integral part of the winding shaft 12.

The tape feed shaft 1 and the winding shaft 12 are adapted to be in engagement with the hubs provided inside the cassette case 34 so that they are rotated together integrally. In a known manner, a magnetic tape 16 has both its ends fixed to hubs 14 and 15 and portions are wound thereon. When the cassette is placed in the tape recorder, the tape 16 is controlled by guide pins 17 and 18 and guide rollers 19 and 20 provided inside the cassette case. The tape is rotated in between the capstan shaft 7 and a pinch roller 21 via magnetic head (not shown) of the tape recorder.

A frame member 43 supports the various shafts. A set holder lever 24 is biased toward the right relative to the FIGURE and has a projection 33 and also a projection 25 on which a lever 28 is pivotally mounted at its center. The lever 28 has at one end thereof a generally arcuately shaped engaging edge 26. The other end is connected to one end of a spring 27 which biases it to a counter clockwise ready position. A pin 29 is mounted on the lever 28 in a position to be engaged by one end of the arm lever 2 when it moves. The surface 26 engages a pin 30 mounted on the pulley 8 when the pulley rotates and since the edge 26 is concave this causes the lever 28 to move against the spring 27 and consequently lever 24 will be moved to the right thus disengaging projection 33 from pawl 23 formed on lever 22. This allows lever 22 to move downwardly relative to the FIGURE to actuate a switch 41 which controls motor 51 to stop the machine.

With the above arrangement of this invention, the device is set for running the tape for reproduction or recording in the following manner. When the tape running set lever 22 is depressed against the spring force of the spring 31, the cam portion 42 of the pawl 23 of the lever 22 engages projection 33 and the pawl will lock with projection 33 to hold the machine in the operative condition with switch 41 closed. The machine starts to operate and the capstan will be driven to drive the tape. The interconnection of the switch 41 and the motor drive, etc. is not shown because these features are well known. When operating the tape 16 is held between the capstan shaft 7 and the pinch roller 21 and is taken up around the hub 15 by means of the winding shaft 12.

During winding operation, the tape feed shaft 1 moves the tape in the direction of the arrow mark A in the drawing. The arm lever 2 which axially supports the tape feed shaft 1 is biased in the clockwise direction by spring 34 which is stronger than the drawing force of the tape. Consequently, the lever 28 remains in the full counterclockwise position due to the force of the spring 27 and surface 26 is out of engagement with pin 30.

Upon completion of the winding of the tape, the end of the tape fastened to reel 15 will cause tension of the tape which applies a turning moment to lever 2.

The tension in the tape at this time is stronger than the tension of the spring 34 against the arm lever 2 and as a result the lever 2 moves slightly in a counterclockwise rotation (the direction marked A in the drawing). The hub 14 in the cassette case 35 has a diameter of 1.9mm (maximum) to 1mm (minimum) greater than the diameter of the hub receiving area in the cassette case (not shown) so that the hub can move relative to the cassette case an amount of at least 0.5mm. Therefore, the hub 14 is urged by the tension of the tape to be moved within this range against the cassette case. As a result, the other end of the arm lever 2, which is farther from the center of rotation, is moved a few millimeters, which magnifies the movement of hub 14. Such movement causes the end of the arm lever 2 to push the pin 29 in the direction of the arrow mark b in the drawing. Hence, the lever 28 is urged to move clockwise relative to the drawing and simultaneously to change the state of the two condition spring 27 and the lever 28 will be held in rotated position. Then the engaging edge 26 of the lever 28 will move into the rotating area of the pin 30 and be engaged thereby.

The pulley 8, which has been rotating continuously, causes the pin 30 to contact the engaging edge 26 and push the lever 28 to the right relative to the drawing. This moves lever holder 24 to the right relative to the drawing against the force of the spring 32 and pawl 23 is released from projection 33. The tape running set lever 22 will then move downward in the direction of the arrow due to the bias of spring 31 and the switch 41 will be opened stopping the capstan drive motor 51.

As the pin 30 continues to rotate further it clears the arc-shaped engaging edge 26 and since the motor 51 has stopped there will no longer be counterclockwise pressure on the tape feed shaft 1 and the arm lever 2 then rotates clockwise under the influence of spring 34. This allows spring 27 to return the lever 28 to its original position away from the capstan shaft.

In the fast forwarding operation, a different energizing lever is actuated but setting and operation are the same as by lever 22. The fast forward lever, not shown, causes the tape 16 to be fed from the tape feed shaft 1 to the winding shaft 12 which is driven due to the coupling between the pulley 8 and the roller 13. At the end of the tape the above described stopping action is performed. During fast forward the tension in the tape at the end of wound up operation is not so strong as in the wind. However, when the fast forwarding action is suddenly stopped at the end of running the tape, there is a very rapid change in the motion of the tape and as a result the tape feed shaft 1 is urged to rotate and cause the lever 2 to move to initiate the automatic stop operation of the mechanism.

During rewinding operation another operating lever for rewinding, not shown, is moved and the driving power transmission system comprising the driving wheel 9 and the pressure roller 11 will be in the state shown in the drawing. At the end of rewinding the tape, the shaft 1 continues to pull the tape 16 in the direction of arrow B as shown. This causes the arm lever 2 to rotate slightly in the counterclockwise direction as described above. As in the case of fast forwarding operation, the reaction caused by the sudden change of speed in rewinding operation of the tape causes the lever 28 to move and provide automatic stop for the rewinding operation.

Although this invention has been described with respect to preferred embodiments, it is not to be so limited as changes and modifications can be made which are within the full intended scope as defined by the appended claims.

I claim as my invention:

1. An automatic tape recorder actuator comprising a frame member, an oscillating arm member pivotally supported by said frame member and spring biased in a first direction, a tape reel shaft rotatably supported on said oscillating arm, a tape cassette with at least one tape reel receivable on said tape reel shaft, a set holder lever slidably mounted relative to said frame, a lever with one end formed into a curved surface and pivotally supported by said set holder lever, a spring mounted between said frame member and said lever, a first pin mounted on said lever and engageable with said oscillating arm lever, a drive pulley rotatably supported by said frame member, a second pin mounted on said drive pulley and engageable with said curved surface of said lever when said holder lever rotates under stop demand conditions to move said set holder lever to stop said tape recorder.

2. An automatic tape recorder actuator according to claim 1 including a spring means biasing said set holder lever relative to said frame, a projection formed on said set holder lever and a tape running lever with a pawl end portion engageable with said projection of said set holder lever.

3. An automatic tape recorder actuator according to claim 2 including a spring biasing means between said frame member and said tape running lever.

4. An automatic tape recorder actuator according to claim 3 including a control switch engageable with said tape running lever.

5. An automatic tape recorder system according to claim 4 including gear drive means between said pulley and tape reel shaft and at least one gear of said gear drive means with its rotational axis mounted on the pivot point of said oscillating arm member.

6. A cassette tape recorder with an automatic switch-off system comprising, an arm lever, a relay gear, a control switch, a tape feed shaft being axially supported at one end of said arm lever which has its rotating center at an axis of said relay gear for transmitting the driving power to the tape feed shaft, said tape feed shaft supported for arcuate motion relative to said cassette case wherein said tape feed shaft is moved relative to the cassette case at the end of tape feeding or rewinding operation by the drawing force of the tape and said movement of the shaft urges the arm lever to contact said control switch to turn off said recorder.

* * * * *